Aug. 21, 1945. W. W. PAGET Re. 22,668

SAFETY TANK AND FUEL SYSTEM FOR AIRCRAFT

Filed Oct. 22, 1942

Inventor:

William Willard Paget

Reissued Aug. 21, 1945

Re. 22,668

UNITED STATES PATENT OFFICE 22,668

SAFETY TANK AND FUEL SYSTEM FOR AIRCRAFT

William Willard Paget, Newark, N. J.

Original No. 2,285,830, dated June 9, 1942, Serial No. 250,846, January 13, 1939. Application for reissue October 22 1942, Serial No. 463,011

10 Claims. (Cl. 158—46)

Figure 1:
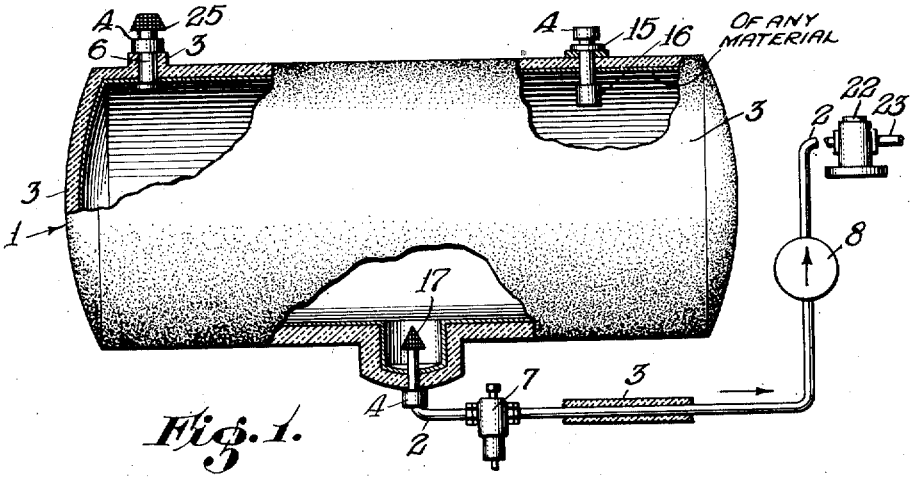

The invention relates to improvements in fuel tanks and fuel systems for aircraft; and the objects of the improvements are principally to provide a really safe fuel supply and fuel system in which is comprised a definitely heat and flame impermeable, fire and explosion proof, safety fuel tank, or container, and fuel supply; and one with the particularly great hazards of fire and explosion, heretofore present, and previously not elsewhere fully nor clearly apprehended, hereby and now by this improvement most effectually remedied, accomplished and removed.

Now a most exhaustive study and original research by the present applicant and inventor finally established the ultimate hypothesis, heretofore not elsewhere fully apprehended, of a definite relationship in the various phenomena attending fires in aircraft, and the several phases, interrelated stages, and aspects, thereof, which by great diligence and application ultimately led to the discovery by the present inventor as herein disclosed and described.

Heretofore, also, other hidden dangers existed unsuspected, and hazards, previously nowhere understood nor truly apprehended elsewhere, as a very real and major cause and factor of many hitherto mysterious and unexplained serious fires of aircraft until first discovered and perceived by me, and here revealed and disclosed. The complemental and concomitant particular dangers inherent to the fuel carrying lines were first and early in these discoveries by me made. In the intense near blast-furnace like heat of fire in aircraft and in the midst of flame these heretofore and hitherto, quite unsuspected small and tiny lines, of small diameter, wall and small cross-section rapidly, and with a small "time factor" of but moments, in some instances, became red-hot or incandescent highly dangerous ignition tubes or media leading directly to the explosive range air-fuel mixture always to be found in part emptied fuel tanks under certain circumstances and conditions definitely positing explosion and disaster. Heretofore, in the midst of fire and flame in the intense near blast-furnace like heat of fires in aircraft, the fuel tank, or tanks, rapidly became pressure-kettles, spurting and spouting blazing fuel under pressure from every opening and broken fuel line, actually feeding the flames, in progressive stages and increasing fury and intensity, to its own ultimate end and destruction.

Broken fuel lines in crashes presented further complications and added to the interrelated phenomena of this fire and explosion hazard problem; a broken fuel line meaning usually, direct free and ready access, and ingress of flames and fire, through the broken fuel line to the interior of tank, and contents, with resultant explosion attendant thereupon; this being a part of the original discovery by the present applicant and inventor. And further, great "spillage" of fuel likewise followed these breaks in fuel lines.

All of which demanded the equally cooperative structure and interrelated combination of elements devolved, developed, and discovered by the present applicant and inventor as herewith set forth and described.

The anti-explosion devices or flame-arresters 4, 4, are therefore provided in the fuel lines, interdependently and cooperatively working in conjunction and combination with the defintely heat and flame impermeable fuel tank 1, suitably endowed with the such said essential and requisite new-physical and heat and flame resisting properties and qualities through means of the encompassing whole outer part element, 3, 3, or member being suitably comprised or formed of such said essential material or substance comprising these said essential, new and requisite physical and heat and flame proof properties and qualities by me provided, and the automatic self-closing valves 7 and 9, also provided, in close interrelated turn. An automatic self-closing valve, however, cannot dependably be counted upon to operate quickly enough to prevent the flashback through said valve before it is fully closed; therefore the anti-explosion device or flame-arresters are provided to efficiently and effectually cooperate with, and support and self-closing valves 7 and 9, in combination therewith, to effect and accomplish, efficiently, the long sought desideratum and purpose. But the flame-arresters 4, 4, of themselves alone, will not operate dependably or successfully over long periods of time, and therefore, they, in turn, require the automatic self-closing valve 7, herewith provided, by the present applicant and inventor, to operate in conjunction, and in combination, with same, and both require and need the heat and flame impermeable fuel tank 1, protected by the essential and requisite cardinal and major element, part, or member 3, 3, to themselves operate dependably, or at all, or over long periods of time as described.

One form and embodiment of the invention as typically shown in an optional specimen fuel system layout is here illustrated in the accompanying drawing.

And while the form or embodiment of the invention, is here shown, comprised or provided in a typical or specimen aircraft fuel system layout, it will be readily seen and understood that there are a number of modifications hereof all properly within the aim, scope, field and purport of this invention, and so, as such by me, here, reserved and claimed; to wit—the improvement is highly adapted to the so called "self-sealing" type and other tanks over which it may be truly looked upon as a markedly advanced improvement likewise the tank itself may be of any suitable material or substance especially adapted therefor as here provided.

Figure 3:
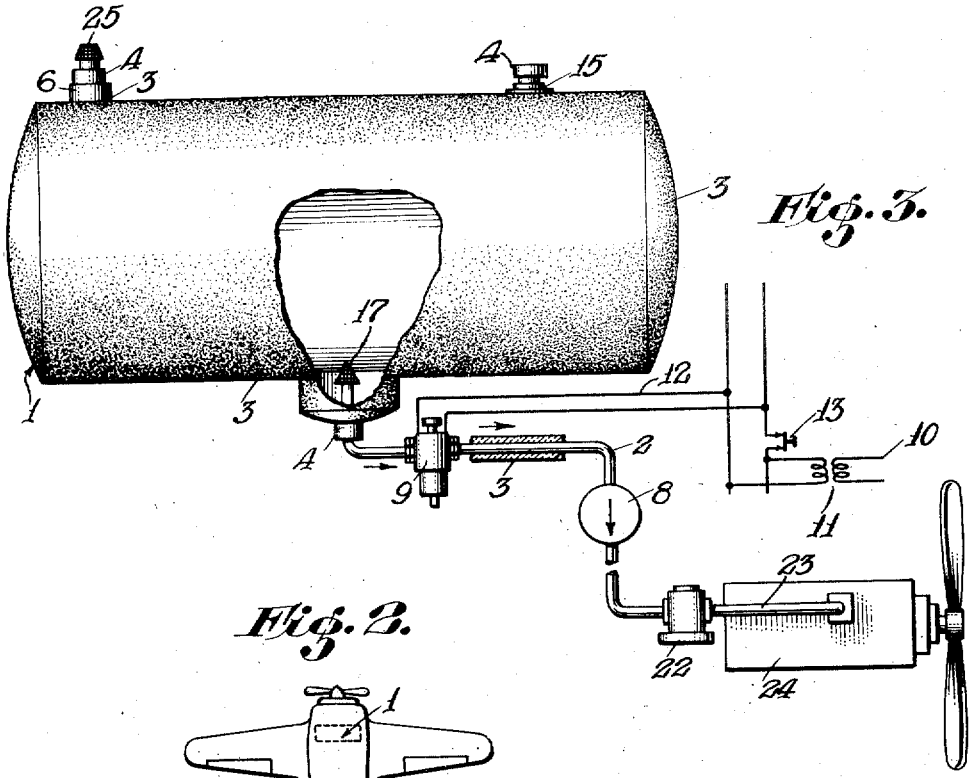
Figure 2:
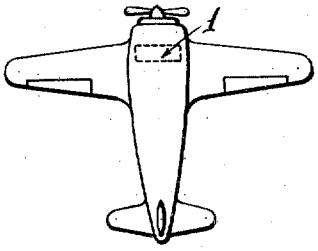

In the drawing, Figure 1 is a side elevational view of the essentially heat and flame proof safety fuel tank, in part sectioned; illustrating the embodiment of the improvement and showing some of the outlets, openings, and connections of the fuel line. Figure 2 illustrates an aircraft in which is provided the safety tank and fuel system embodied in Fig. 1 and Fig. 3. Figure 3 is a diagrammatic view, in part sectioned, of a complete typical fuel system for aircraft provided with the improvement illustrating in a part sectioned view the all essential safety heat resisting, heat and flame proof fuel tank embodied therein as a most cardinal part thereof, suitably adapted to hold a liquid fuel, and further comprising and provided with the encompassing high temperature resistant heat and flame proof surrounding outer element part or member 3, 3, therewith provided.

With reference to the drawing in Figure 1, the numeral 1 indicates a fuel tank, 2 is the fuel line, 3 is the all important heat and flame impermeable insulating jacketing element or member which may comprise mineral wool, asbestos, magnesia or aluminum foil, or other suitable heat and flameproof material, and 4, 4 are the anti-explosion devices, or flame arresters, so called, effectually, interdependably, and successively, progressively operating cooperatively, in turn, with 3, and 7, which is an automatic self-closing shut-off valve, preferably of the differential spring loaded or other equally suitable type. 16 is a non-return back-pressure or self-closing check valve as provided in said fuel inlet; 8 is a fuel pump. In Fig. 3, 9 is another type of automatic or self-closing valve; 10 and 11 are an optional electric control circuit and current source respectively, as used in a modification; 12 is a part of said electric control circuit; and 13 is a switch as employed in said modified system; 15 is a fuel inlet provided with a nonreturn valve 16, shown in Fig. 1; 17 is a strainer; 22 is a carburetor in an aircraft; 23 is manifold; 24 is an aircraft engine; and 8 is a typical fuel pump. Fig. 2 shows an aircraft in which is installed the heat and flame impermeable safety fuel tank comprised in the safety fuel system illustrated and embodied in Figs. 1 and 3.

And while I have here shown the form or embodiment of the improvement provided in a conventional or typical aircraft fuel system piping layout with one or more fuel tanks and essential parts, it will be readily understood and apprehended that the herewith described safety system is readily adapted to any method of aircraft fuel system piping, or other tank types, or modifications thereof; and all properly well within the aim, scope, field, object and full purport of the invention, and so, as such by me reserved and claimed. It will be understood that the said exterior high temperature resistant, thermal nonconducting, substantially heat and flame proof element or outer part is of thermal nonconductivity nonmetal substances and materials.

Having thus described the invention, what is claimed is:

1. A safety fuel system for aircraft; said safety fuel system being provided with a fuel tank comprising a fuel container connected through fuel lines to pump, carburetor, parts, passages, and channels, and an aircraft engine; and said safety fuel container being suitably encompassed and encased in an essentially high temperature resistant, substantially heat and flame impermeable, surrounding outer garment, or encasing element, or member, provided therefor; especially and suitably adapted to effectually inhibit and prevent the transfer, transmission, or access of external heat, or fire, to the interior of said fuel container, or the fuel contents thereof; as installed in above said aircraft.

2. A safety fuel tank for aircraft, of so termed, military, "self-sealing," or other like type, adapted to be connected, through fuel lines, pump, parts, passages, and ducts, to carburetor, and an aircraft engine; and said safety "self-sealing" fuel tank, or container, having, or being provided with, an encompassing exterior layer of especial essentially high temperature resistant, substantially heat and flame impermeable fireproof material; and said essentially high temperature substantially heat and flame proof, outer part, or member, being suited and adapted to effectively inhibit and prevent the transfer or transmission of external heat, or the ingress and access of flame, to the interior, or contents, of said safety fuel container, during the period or progress of external flame, or fire.

3. A safety fuel system for aircraft, in which is provided a safety fuel tank comprising a fuel container, suitably provided with a superposed high temperature resistant, substantially heat and flame impenetrable, encompassing insulating element or member composed preferably of suitable mineral substance, substances, or material, such as mineral wool, asbestos, or material of like, similar, or equivalent essential physical properties or heat and flame proof characteristics; as installed in such aircraft; as means for, and adapted to, inhibiting or preventing the ingress of heat or flame to the interior, or fuel contents, of said safety fuel container, in event of crash, or flame and fire.

4. A safety fuel tank for aircraft, of so termed, military, "self-sealing," or other like type, adapted to be connected, through fuel lines, pump, parts, passages, and ducts, to carburetor, and an aircraft engine; and said safety "self-sealing" fuel tank, or container, having, or being provided with an encompassing exterior element of especial essentially high temperature resistant, substantially heat and flame proof material, and said essentially high temperature substantially heat and flame proof, outer part, or member, being suited and adapted to effectively inhibit and prevent the transfer or transmission of external heat, or the ingress and access of flame, to the interior, or contents, of said safety fuel container, during the period or progress of external flame, or fire.

5. A safety fuel tank for aircraft of so termed, military, "self-sealing," or other like type, adapted to be connected, through fuel lines, pump, part, passages and ducts, with an aircraft engine; and said safety "self-sealing" fuel tank, or container, having, or being provided with an encompassing exterior stratum of especial essentially high temperature resistant, substantially heat and flame proof material, and said essentially high temperature substantially heat and flame proof, outer part, or member, being suited, and adapted to effectively inhibit and prevent the transfer or transmission of external heat, or the ingress and access of flame, to the interior, or contents, of said safety fuel container, during the period or progress of external flame, or fire.

6. A safety fuel tank for aircraft, of so-termed, "self-sealing," or other like type, adapted to be connected, through fuel lines, pump, parts, passages, and ducts, to carburetor, and an aircraft engine; and said safety "self-sealing" fuel tank or container, having, or being provided with, an encompassing exterior element, or member, wholly of essentially high temperature resistant, thermally impermeable, substantially heat and flame proof substance, or material, and said essentially high temperature thermally impermeable, substantially heat and flame proof outer part or member, being suitably adapted to effectively inhibit and prevent the transfer or transmission of external heat, or the ingress and access of flame, to the interior, or contents, of said safety fuel container, during the period or progress of external flame, or fire.

7. A safety fuel tank for aircraft, adapted to be connected through fuel lines, pump, parts, passages and ducts, with an aircraft engine; and said safety fuel tank or container having and being provided with an encompassing exterior stratum, wholly of essentially high temperature thermally impermeable, substantially heat and flame proof nonmetal material, and said essentially high temperature thermally impermeable, substantially heat and flame proof outer part or member, being suitably adapted to effectively inhibit and prevent the transfer or transmission of external heat, or the ingress and access of flame, to the interior or contents of said safety fuel container, during the period or progress of external flame or fire.

8. A safety fuel tank for aircraft, adapted to be connected, through fuel lines, pump, parts, passages, and ducts, with an aircraft engine; and said safety fuel tank, as provided, having an encompassing exterior element or member of essentially high temperature resistant, thermally impermeable substantially heat and flame proof material, and said essentially high temperature substantially heat and flame proof, outer part or element, being suited and adapted to effectively inhibit and prevent the transfer or transmission of external heat, or the ingress and access of flame, to the interior or contents, of said safety fuel container, during the period of progress of external flame, or fire.

9. A safety fuel tank for aircraft, adapted to be connected, through fuel lines, pump, parts, passages, and ducts with an aircraft engine; and said safety fuel tank, as provided, having an encompassing exterior stratum of essentially high temperature resistant thermally impermeable substantially heat and flame proof material, and said essentially high temperature substantially heat and flame proof, outer part or member, being suited and adapted to effectively inhibit and prevent the transfer or transmission of external heat, or the ingress and access of flame, to the interior, or contents, of said safety fuel container, during the period or progress of external flame, or fire.

10. A safety fuel tank for aircraft adapted to be connected through fuel lines, pump, parts, passages and ducts, with an aircraft engine; and said safety fuel tank, as provided, having an encompassing exterior stratum of essentially high temperature resistant, thermally impermeable substantially heat, and flame proof substance, or material, and said essentially high temperature, substantially thermally impermeable heat and flame proof outer part or member being suitably adapted to effectively inhibit and prevent the transfer or transmission of external heat or the ingress and access of flame to the interior, or contents of said safety fuel tank, during the period or progress of external flame, or fire.

WILLIAM WILLARD PAGET.